Oct. 6, 1959
N. D. NEWBY
2,907,075
METHOD OF MAKING AN INSULATED CONDUCTOR
Filed May 9, 1957
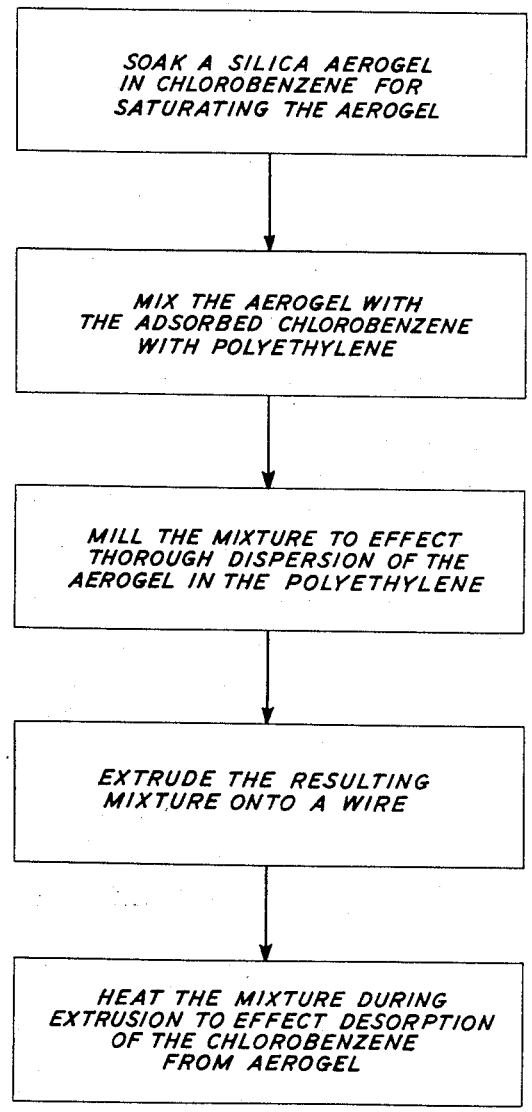
INVENTOR
N. D. NEWBY
BY
*Edwin B. Cave*
ATTORNEY

United States Patent Office 2,907,075
Patented Oct. 6, 1959

2,907,075

METHOD OF MAKING AN INSULATED CONDUCTOR

Neal D. Newby, Leonia, N.J., assignor to Bell Telephone Laboratories, Incorporated, New York, N.Y., a corporation of New York Application May 9, 1957, Serial No. 658,030

5 Claims. (Cl. 18—59)

This invention relates to a method of making foamed materials and relates particularly to a method of making foamed electrical insulation.

The addition of a gas, such as air, to a composition by frothing or foaming the composition is known in the art. Foam rubber is an example of a material produced by mechanical frothing, for example. In the manufacture of electrically insulating materials, such as for wire coating, the inclusion of gases in an insulating composition is particularly desirable. Such entrapped gases generally have a lower dielectric constant than do conventional insulating materials: their inclusion in the insulation results in better insulating properties.

In manufacturing foamed insulation, foaming can be induced by a variety of techniques other than mechanical agitation. Thus, a volatile solvent may be dissolved or dispersed in the coating composition and later volatilized by heating or reducing the pressure on the composition. Polymerization reactions can be used which produce gas to foam the polymerizing material. Solid foaming agents such as ammonium carbonate can be added to a composition and then later decomposed by heating. In these methods, it is difficult to get a uniform foaming throughout the material. In consequence, there is often little control over the size and spatial distribution of the bubbles generated in the composition, and non-uniform foamed structures are produced.

A good distribution of non-reactive solid particles throughout a composition is comparatively easily accomplished however. Thus, the association of a gas with uniformly-distributed solid particles is a feasible means of producing uniform foamed structures. Such a technique has been tried heretofore in the art. Beads of aerated glass or puffed silica have been added to compositions to provide entrapped gas in the composition. British specification 615,131, accepted January 3, 1949, describes the addition of diatomaceous silica to insulating compositions to provide trapped air. However, in such materials in which only mechanically entrapped gas is relied upon in an insulating material, the ratio of the volume of the added solid, of high dielectric constant, to gas of low dielectric constant introduced is generally so high that no significant improvement in electrical properties of the composition is obtained.

In the method of the present invention, silica gel having fluid adsorbed thereon is distributed uniformly throughout a plastic composition, and the adsorbed fluid is then volatilized by heating. Uniform distribution of the solid gel particles throughout the composition can be achieved before foaming is induced. Because of the large amount of fluid which can be adsorbed on silica gel, volatilization of the fluid generates a volume of gas which exceeds by far the volume of the silica particle. The resulting ratio of gaseous volume to solid volume is larger than the ratio resulting when porous materials relying solely on mechanical entrapment of gas are used in similar compositions. The dielectric properties of the composition are correspondingly enhanced. The drawing illustrates one embodiment of the present invention.

By the term "silica gel" is meant linked or flocculated particles of amorphous silica. As described in The Colloid Chemistry of Silica and Silicates, by Ralph K. Iler, Cornell University Press, Ithica, New York, 1955, chapter VI "Amorphous Silica Gels and Powders," at page 127 et seq., amorphous silica has a wide variety of physical forms, depending on the degree of linking of fine colloidal particles of silica. The adsorbent gels of particular interest to the present invention are porous aggregates of finely-divided particles. The aggregates, before treatment with the volatile fluids which are to be added to a coating composition, are xerogels—gels from which the liquid phase has been evaporated—and are commercially obtainable in a number of particle sizes.

United States Patent No. 2,106,744, for example, describes the formation of a porous silica material which can be ground to fine particles and used in the foamed structures here described. Table XII, page 172 through 173, of the aforementioned book by Iler tabulates the properties of a number of suitable finely-divided silica gel materials, with their trade names and manufacturers. These gels include "Celite," produced by the Johns-Manville Company, "Santocel" supplied by the Monsanto Chemical Company, "Estersil," a product of the E. I. du Pont Company, and a variety of gels known as grades 963, 973, 971, 921, 979 available from the Davison Chemical Company. Both powdered and granular xerogels are adaptable to the present invention. A choice between these forms depends on the size of the particle desired to be incorporated into the coating composition.

The size of the silica particle added as a carrier for a fluid will in part determine the size of bubble produced in the foamed plastic composition. Larger particles, with larger quantities of fluid adsorbed thereon, will be capable of generating greater gas volumes than will relatively smaller, more finely-divided particles. Silica aggregates from about 0.5 micron to about 50 microns in size are useful in the practice of the invention. For a very fine bubble structure, the silica aggregate size will generally be chosen between 0.5 micron and 20 microns. Larger bubbles can be produced using particles of larger size, between 20 microns and 50 microns. The fineness of the particles desired can be described generally by specifying that the particles pass a 270 mesh sieve. On the United States Standard Screen Scale, such sieves have a mesh opening of 53 microns.

Adsorbent particles of these sizes are then contacted with an adsorbable fluid. Desorption of adsorbed fluids from silica gel is usually accomplished by heating the gel at a temperature at least about 10° C. and often at least 50° C. above the boiling point of the adsorbed liquids. To prevent high-temperature degradation of the organic insulating compositions with which the silica particles are usually mixed and in which they will be heated to bring about desorption, fluids boiling below 175° C. or 150° C. at a pressure of one atmosphere are used. These liquids are primarily organic materials, and preferably so, since such liquids have relatively low dielectric constants. Water may be used in some instances, but because of its conductivity it is not a preferred material.

Any organic liquid boiling in the range specified above can be used. Because only relatively small quantities of saturated hydrocarbons are adsorbable on silica gel, aromatic compounds, substituted or unsubstituted, and substituted alkyl materials are preferred as the fluids used in the invention. A number of such materials, with their approximate normal boiling points, are tabulated in Table I below. The list is exemplary only. Other suitable materials boiling within the desired range will readily be apparent to those skilled in the art and can be determined from boiling point tables.

TABLE I

| | °C. |
|---|---|
| n-Butylamine | 78 |
| Ethyl alcohol | 78 |
| Sec-butyl alcohol | 100 |
| Pyridine | 115 |
| Ethyl acetate | 77 |
| 1,4-dioxane | 101 |
| 1-nitropropane | 132 |
| Toluene | 110 |
| n-Amyl chloride | 108 |
| Benzene | 80 |
| Chlorobenzene | 132 |
| Carbon tetrachloride | 77 |
| Furan | 32 |
| Methyl formate | 32 |
| Acetaldehyde | 21 |
| Ethyl chloride | 12 |
| Isobutane | 10 |
| 2,2-dimethylpropane | 9 |
| Methyl bromide | 5 |

Premature volatilization of liquids boiling below room temperature is prevented by working at pressures above atmospheric or by chilling the plastic compositions in which such fluids have been used. The use of these liquids has the advantage that, upon volatilizing by reducing ambient pressure or raising the composition's temperature, the pressure of the gas within the bubbles formed will temporarily exceed one atmosphere, discouraging collapse of the bubble till the plastic material of the bubble wall loses plasticity.

Particles of silica gel are wet with the liquid to be used by soaking the particles in the fluid. Though adsorption to saturation is generally complete within 2 or 3 hours, adsorption need not be carried through to saturation, as long as some fluid is adsorbed. Excess fluid is decanted, and the mass of particles, with fluid adsorbed thereon, is then incorporated into the coating composition by thorough mixing.

Between 10 parts by volume and 70 parts by volume of silica particles may be combined with the insulating material used to give 100 parts of the composition as used. Because each silica particle acts as a bubble nucleus, compositions containing a high proportion of the silica will have more bubbles after expansion of the adsorbed liquid.

The materials with which the silica may be combined are materials now known in the art as electrical insulating compositions. They are generally mixtures containing an organic polymeric material as a base, with fillers, pigments, antioxidants and plasticizers optionally added. The principal material, for example, may be a hydrocarbon polymer such as rubber, polyethylene, polypropylene, polystyrene, or polybutylene, or may be a substituted hydrocarbon polymer such as polyvinyl chloride and other polyvinyl resins, or some of the synthetic rubbers. A variety of organic materials suitable for use as electrical insulators, particularly for flexible insulating coatings, is listed in the Handbook of Plastics, H. R. Simonds and C. Ellis, D. Van Nostrand and Company, New York, 1943, pages 294 through 337. Silica gel, after the volatile fluid chosen has been adsorbed thereon, is incorporated into insulating compositions of these types by thorough mixing. The resultant mixture can then be shaped by molding or extruding or applied to a body as an insulating coating.

Shaping or application as a coating may be by any known means. For some materials, such as polyethylene, extrusion of the mixture containing silica gel, as onto a wire, is particularly appropriate. For others, application as a coating by dipping, spraying or painting may be more desirable. In the latter case, solutions of the insulating organic material in a solvent may be prepared. The silica gel with its adsorbed phase is homogeneously dispersed throughout this solution. The compositions also may be cast or molded with molds and dies.

After application as a coating, or after shaping, desorption of fluid from silica gel in the composition can be brought about by heating the composition. The temperatures required for desorption vary with the kind of fluid being desorbed. In general, a temperature at least about 10° C. and often at least 50° C. higher than the boiling point of the adsorbed fluid at the ambient pressure is used to desorb substantially all of the fluid, as vapor, from a silica surface. Higher temperatures are usually required to desorb small residual amounts of fluid from the gel, but between 50 percent and 90 percent of adsorbed fluid can usually be desorbed in the temperature range mentioned above. Heating at temperature close to the boiling point will desorb more fluid than will heating at lower temperatures. Some control over the extent of bubble formation is thus given by temperature control of the desorption process. If desired, reduction of pressure over the article being heated may be used to facilitate the process of desorption.

Desorption is carried out while the insulating composition is plastic and resilient and offers little resistance to expansion by bubble formation. For thermoplastic insulating materials, which are conveniently molded, cast, or extruded onto wires, expansion is easily carried out on warm pliable masses. For extruded coatings, for example, the extruding head may be conveniently warmed to a temperature promoting desorption if the extruded mass is below the desorbing temperature. If the temperature of the extruder storage chamber and the throat of the extrusion die is high, premature expansion of the composition can be prevented by pressure on the composition during the extrusion process. When this pressure disappears on emergence of the extruded mass, bubble formation occurs, the temperature of the extruded mass now exceeding the boiling point of the adsorbed fluid at the reduced pressure outside the extruder.

For dipped or painted coatings, desorption may best be initiated while sufficient solvent from the mixture used in application still remains so that a plastic, deformable, coating is present.

The use of the invention to produce a foamed polyethylene coating as depicted by the drawing is exemplified below.

Example 1

A silica aerogel having a maximum particle size of 20 microns (Davison Chemical Company Grade 963) is saturated with chlorobenzene by allowing a mixture of the gel and the fluid to stand for an hour. Fifty parts by volume of the gel, with the adsorbed liquid, is then mixed with 50 parts by volume of DYNK polyethylene, a high-pressure low temperature polymer with a melt index of about 0.2–0.4, supplied by the Bakelite Company. Thorough dispersion of the gel in the polymer is accomplished by milling at a temperature of 130° C.–135° C. for at least 10 minutes. The resulting mixture is then extruded onto a wire using conventional extrusion apparatus, the temperature of the mixture at the extruder head being kept between about 180° C.–205° C.

Though particular embodiments have been described, it is to be understood that they are illustrative only and not limiting on the scope and spirit of the invention.

What is claimed is:
1. The method of producing a foamed insulating coating on a body, which method comprises dispersing aerogel particles of silica gel of 0.5 micron to 50 microns size having an adsorbable organic liquid adsorbed thereon throughout an organic polymeric composition, said liquid having a boiling point lower than the degradation temperature of said organic polymeric composition, applying said composition containing the dispersed gel as a coating on a body, and then desorbing the adsorbed liquid from the silica gel by heating at a temperature sufficient to volatilize the adsorbed liquid, whereby the vapors generated produce bubbles having a volume greater than the volume of the silica gel throughout the composition.

2. The method of producing a foamed insulating body which comprises dispersing aerogel particles of silica gel of 0.5 micron to 50 microns size having an adsorbable organic liquid adsorbed thereon throughout an organic polymeric composition, said liquid having a boiling point lower than the degradation temperature of said organic polymeric composition, and forming the resulting mixture in a die while simultaneously desorbing the adsorbed liquid from the silica gel by heating to a temperature sufficient to volatilize the adsorbed liquid, whereby the vapors generated produce bubbles having a volume greater than the volume of the silica gel through the mixture.

3. The method of producing a foamed insulating coating on a wire, which method comprises dispersing aerogel particles of between 10 parts by volume and 70 parts by volume of silica gel of 0.5 micron to 50 microns size having an adsorbable organic liquid adsorbed thereon throughout a plastic organic polymeric insulating composition, suitable for wire coating, said liquid having a boiling point lower than the degradation temperature of said organic polymeric insulating composition, to give 100 parts by volume of an expandable coating mixture, applying the coating mixture to a wire, and then desorbing the adsorbed liquid from the silica gel by heating at a temperature higher than the boiling point of the adsorbed liquid, whereby the vapors generated produce bubbles having a volume greater than the volume of the silica gel throughout the composition.

4. The method as described in claim 3 for which the plastic organic polymeric insulating composition is a hydrocarbon polymer.

5. The method of producing a foamed polyethylene insulating coating on a wire, which method comprises dispersing between 10 parts by volume and 70 parts by volume of aerogel particles of silica gel of 0.5 micron to 50 microns size having an adsorbable organic liquid with a boiling point below 175° C. adsorbed thereon throughout a plastic polyethylene composition to give 100 parts by volume of a coating mixture, said boiling point being below the degradation temperature of said polyethylene composition, extruding the coating mixture onto a wire, and then desorbing the adsorbed liquid from the silica gel by heating at a temperature between 10° C. and 50° C. higher than the boiling point of the adsorbed liquid, whereby the vapors generated produce bubbles having a volume greater than the volume of the silica gel throughout the composition.

References Cited in the file of this patent

UNITED STATES PATENTS

| | | |
|---|---|---|
| 2,329,322 | Baty et al. | Sept. 14, 1943 |
| 2,518,454 | Elliott | Aug. 15, 1950 |
| 2,766,481 | Henning | Oct. 16, 1956 |
| 2,772,322 | Witt et al. | Nov. 27, 1956 |